United States Patent
Jung et al.

(10) Patent No.: US 11,767,387 B2
(45) Date of Patent: Sep. 26, 2023

(54) COPOLYMER FOR USE IN A DIGITAL MANUFACTURING PROCESS

(71) Applicant: iSQUARED AG, Lengwil (CH)

(72) Inventors: Christoph Jung, Landsberg am Lech (DE); Gerhard Maier, Munich (DE); Jürgen Stebani, Kaufbeuren (DE); Jan-Michael Stepper, Ermatingen (CH)

(73) Assignee: ISQUARED AG, Lengwil (CH)

( * ) Notice: Subject to any disclaimer, the term of this patent is extended or adjusted under 35 U.S.C. 154(b) by 59 days.

(21) Appl. No.: 17/174,472

(22) Filed: Feb. 12, 2021

(65) Prior Publication Data

US 2021/0253763 A1     Aug. 19, 2021

(30) Foreign Application Priority Data

Feb. 14, 2020   (EP) .................................... 20157421

(51) Int. Cl.
| | | |
|---|---|---|
| *C08F 220/06* | (2006.01) | |
| *B33Y 70/00* | (2020.01) | |
| *B29C 64/40* | (2017.01) | |
| *B29C 64/118* | (2017.01) | |
| *B29K 33/00* | (2006.01) | |
| *B29K 105/00* | (2006.01) | |
| *B33Y 10/00* | (2015.01) | |

(52) U.S. Cl.
CPC ............ *C08F 220/06* (2013.01); *B29C 64/40* (2017.08); *B33Y 70/00* (2014.12); *B29C 64/118* (2017.08); *B29K 2033/08* (2013.01); *B29K 2105/0085* (2013.01); *B33Y 10/00* (2014.12)

(58) Field of Classification Search
CPC ..... C08F 220/06; B29C 64/40; B29C 64/118; B33Y 70/00; B33Y 10/00; B29K 2033/08; B29K 2105/0085; B08F 220/06
See application file for complete search history.

(56) References Cited

U.S. PATENT DOCUMENTS

| | | | |
|---|---|---|---|
| 2005/0004282 A1* | 1/2005 | Priedeman ............. | B33Y 70/00 264/308 |
| 2013/0083276 A1* | 4/2013 | Iwahashi .................. | G03C 1/76 347/110 |

(Continued)

FOREIGN PATENT DOCUMENTS

| | | | |
|---|---|---|---|
| CN | 106349422 A | * | 1/2017 |
| EP | 2 514 775 A1 | | 10/2012 |

(Continued)

OTHER PUBLICATIONS

English translation of JP-02161443-A by EPO (Year: 1990).*

(Continued)

*Primary Examiner* — Leith S Shafi
*Assistant Examiner* — Inja Song
(74) *Attorney, Agent, or Firm* — Finch & Maloney PLLC

(57) ABSTRACT

Copolymers for use in a digital manufacturing process, in particular support materials for use in a digital manufacturing process comprising such copolymers. More particularly, the invention is directed to a copolymer, a support material based on the the copolymer, the use of the copolymer in a digital manufacturing process, a method for preparing the copolymer and a method for building a 3D-model by using a support material comprising the copolymer.

13 Claims, 2 Drawing Sheets

(56) References Cited

U.S. PATENT DOCUMENTS

2015/0024309 A1* 1/2015 Martin ............... G03G 9/08797
                                                                    430/48
2016/0068678 A1   3/2016 Luo et al.
2017/0240675 A1* 8/2017 Yoshimura ................ D01F 6/42
2018/0030234 A1* 2/2018 Priedeman, Jr. ........ B29C 64/40

FOREIGN PATENT DOCUMENTS

| EP | 2662393 A1 * | 11/2013 | ............ C08F 220/18 |
| EP | 3 208 073 A1 | 8/2017 | |
| EP | 3 122 537 B1 | 4/2018 | |
| JP | 02161443 A * | 6/1990 | |
| JP | H02-161443 A | 6/1990 | |

OTHER PUBLICATIONS

English translation of CN-106349422-A by EPO (Year: 2017).*
European Search Report Corresponding to 20157421.7 dated Jul. 31, 2020.

* cited by examiner

COPOLYMER FOR USE IN A DIGITAL MANUFACTURING PROCESS

TECHNICAL FIELD OF THE INVENTION

The invention relates to the technical field of copolymers for use in a digital manufacturing process, in particular support materials for use in a digital manufacturing process comprising such copolymers.

BACKGROUND OF THE INVENTION

Such copolymers are suitable for various applications, including their use as dispersing agents, rheology modifiers, printing pasts, detergents or suspending agents. However, such copolymers are especially suitable in digital manufacturing processes.

Digital manufacturing processes or three-dimensional (3D) printing makes it possible to additively manufacture a real object from a virtual dataset. The method is based on the concept of cutting of a 3D virtual object into 2D layers. The thin layers of building material are deposited one by one by fixing them on the previous ones, eventually forming the desired object. Among the building materials constituting the object are plastic materials, wax, metal or ceramics. Examples of additive techniques are the deposition of fused deposition (FDM) and laser sintering (laser sintering).

Digital manufacturing processes often require the use of support structures, especially when the object to be printed has overhanging portions. For example, when using an inkjet method, there have been proposed techniques in which the main body is formed using a polymeric composition which produces a water-insoluble cured or hardened object. In contrast, support regions are formed using a different composition which produces water-soluble, removable structures. As soon as the construction process of object is finished, the support material may be eliminated.

Molten filament deposition modelling is a mechanical technique which makes it possible to create parts made of material, having mechanical and thermal stability similar to injection-moulded pieces. The technique consists in melting a filament of synthetic material through an extrusion nozzle heated to a temperature of between 160 and 270° C. The nozzle extrudes a molten filament which is deposited and sticks by fusion to what has been manufactured previously. The technique is also suitable for the deposition of support structures, if necessary, since supports regions can easily be fabricated from a different material than the one used for the object to be created.

In order for support material in molten filament techniques to be efficient, it must meet precise specifications. Among the desired properties, in addition to the mechanical strength, are glass transition temperatures and thermal stability. A key property is solubilization or dispersibility of the support material in aqueous solution. The more efficient such removal process is the shorter becomes the overall manufacturing time.

US 2016/00068678 discloses a polymeric composition which can be used as a temporary support material in additive manufacturing of three dimensional articles. Support structures can be removed quickly by hand or with simple tools such as tweezers. However, such removal by hand is no longer suitable when automated processes are envisaged.

A method based on the use of water soluble support materials, which are removed after the manufacturing by water jet elimination, is described in EP 3 122 537. EP 3 122 537 applies very specifically to photocurable resins though.

SUMMARY OF THE INVENTION

It is therefore an object of the present invention, to provide a copolymer for use in digital manufacturing processes which overcomes the drawbacks of the state of the art. In particular, it is an object of the present invention to provide a copolymer having improved solubility in mild aqueous solutions, while maintaining other important characteristics such as Tg, thermal stability, melt flow or mechanical properties.

The object is achieved by means of a copolymer, the use of the said copolymer in a digital manufacturing process, a method for preparing the said copolymer and a method for building a 3D-model by using a support material comprising the said copolymer, according to the independent claims.

The copolymer according to the invention comprises
- a plurality of carboxyl monomer units derived from methacrylic acid monomers (MAA);
- a plurality of phenyl monomer units, preferably phenyl monomer units derived from styrene monomers;
- a plurality of first carboxylate ester monomer units derived from alkyl (meth-)acrylate monomers;
- a plurality of second carboxylate ester monomer units derived from ethylhexyl acrylate monomers;

wherein the first and the second carboxylate ester monomer units differ in their structural formula.

A copolymer comprising the components as listed has excellent properties regarding the resulting support structures but also regarding processability of the material.

It is particularly relevant that the support structures have appropriate strength and toughness in order to fulfil their support function. However, the resulting structures must also be readily removable, preferably dissolvable in a washing step, such as a bath of aqueous solution or in a water jet elimination treatment. These requirements are met by the copolymer according to the invention.

With regard to processability of the material, desirable properties are thermic resistance, stability at elevated processing temperatures, in particular controllable behaviour during extrusion, which allows for safe and easy handling. For example, the processing of polymers based on methacrylic acid is often accompanied by the development of smoke or gas, which increases exposure to harmful substances in production facilities and requires additional measures to ensure workplace safety. In contrast, a copolymer according to the present invention, due to its monomer combination, has excellent processability without such smoke or gas development being observed. Furthermore, materials must have suitable glass transition temperatures, flow rates and creep relaxation in order to be extruded under the specific conditions of additive manufacturing. These requirements are also met by the copolymer according to the invention.

The desired properties can be achieved due to the use of ethylhexyl acrylate monomers. Ethylhexyl acrylate monomers afford monomeric units of the following structural formula, when—in a preferred embodiment—2-ethylhexylacrylate is used as a starting material:

Formula 1

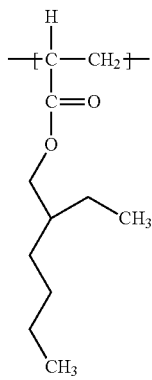

It has been found by the inventors that carboxylate ester monomer units derived from ethylhexyl acrylate monomers are very suitable to achieve the above listed properties. In particular, it is a benefit of the copolymer according to the invention that it ensures good adhesion of a resulting support material to building materials (even non-polar building materials) while having no negative impact on its solubility in aqueous media, in particular in alkaline solution. It is especially preferred that the relative amount of ethylhexyl acrylate monomers arises to at least 12 wt % of the overall molecular composition by weight, more preferably the relative amount is 12 to 20 wt % of the overall molecular composition by weight.

It is another favourable property of a copolymer according to the invention, that ethylhexyl acrylate monomers are relatively little volatile, compared to monomers traditionally used for 3D-printing materials. For example, n-butyl acrylate has a vapour pressure of 28.2 hPa at 50° C. (boiling point: 148° C.). In contrast 2-ethylhexylacrylate has a vapour pressure of only 1.33 hPa at 50° C. (boiling point: 214° C.). Low volatility of organic compounds makes them easily processable and better suitable with regard to work place safety.

It is preferred that the plurality of first carboxylate ester monomer units is derived from methyl methacrylate monomers (MMA). If, methacrylic acid monomers (MAA) are used alongside methyl methacrylate monomers (MMA), a substantial part of the copolymer will be composed of the following molecular formulas:

Formula 2

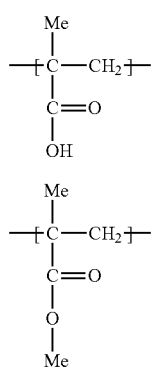

Formula 3

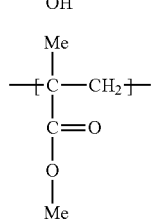

It is an advantage of relatively short side chains of the copolymer backbone that adhesion to the building material is particularly high as a result of the combination of methacrylic acid and methyl methacrylate.

In an embodiment of the invention, the copolymer comprises the above listed components in the following relative amounts of monomer units:
- 35-45 wt % of carboxyl monomer units derived from methacrylic acid monomers (MAA);
- 25-30 wt % of phenyl monomer units, preferably phenyl monomer units derived from styrene monomers;
- 10-15 wt % of first carboxylate ester monomer units derived from alkyl methacrylate monomers,
- 12-20 wt % of second carboxylate ester monomer units derived from ethylhexyl acrylate monomers;

based on an entire weight of the primary copolymer.

It is particularly preferred that the relative amounts add up to 100 wt % to give a tetrapolymer.

A copolymer, in particular a tetrapolymer, having the above said composition typically has a glass transition temperature Tg in the range of 90 to 140° C., preferably from 94° C. to 120° C., more preferably from 105° C. to 115° C., measured according to ISO 11357-2:2013-05. In this embodiment, the Tg of the copolymer is such that it can be extruded at elevated temperatures, while it cools down, after deposition, to give a support structure at temperatures of about 85° C. to 105° C. These are temperatures typically prevailing in a build chamber of a digital manufacturing system. Such glass transition behaviour Tg ensures a good balance between easy deposition and the risk of mechanical distortions in the deposited layers of the growing digitally manufactured structure.

The number average molecular weight (Mn) typically is in the range of 50,000-70,000 g/mol, preferably 56,000-66,000 g/mol, more preferably 58,000-64,000 g/mol. The weight average molecular weight (Mw) can be adjusted to be in the range of 90,000-140,000 g/mol, preferably 100,000-120,000 g/mol, more preferably 105,000-115,000 g/mol. The molecular weight is determined by gel permeation chromatography GPC according to DIN 55672-1: 2016-03 against polystyrene standards. These ranges for molecular weights are particularly suitable for the purposes of additive manufacturing techniques, because such polymers provide a good balance of melt viscosity, mechanical strength and acceptable dissolution time. These values generally increase with increasing molecular weight.

It is preferred that in a copolymer as described above the carboxyl groups are present along a carbon chain of the copolymer and are linked at least partly in each case with a side group of a neighbouring monomer unit within the carbon chain with formation of intramolecular anhydride structures.

Anhydride structures can form spontaneously in a copolymer according to the invention when exposed to heat. A copolymer of the above components has a high share of monomer units bearing carboxyl groups. More specifically, such monomer units have a carboxyl group or carboxylate group or a masked carboxyl group, in particular an ester group, outside the carbon backbone of the copolymer. Often, the carboxyl group will have a neighbouring monomer unit whose side group is reactive towards carboxyl groups. Typically the adjacent monomer unit is another monomer unit carrying carboxyl groups. In this case, intramolecular anhydride structures are formed by a condensation reaction between two carboxyl groups. Water molecules or alcohols are formed as condensation products, which can be removed from the reaction mixture with minimal technical effort. The anhydride structures are present in the form of rings, preferably in the form of six-membered rings.

Copolymers as described above and having carboxyl side groups along a carbon chain of the copolymer linked at least partly with a side group of a neighbouring monomer unit within the carbon chain by forming of intramolecular anhydride structures are particularly tough, thermically resistant and processable at relevant temperatures.

A copolymer, in particular a tetrapolymer, having the above said composition dissolves rapidly in NaOH solution to give a clear, colourless and fibre-free solution. In an embodiment, the copolymer is soluble under stirring in alkaline solution of pH 13 (0.1M NaOH) at 70° C. within less than 50 min, preferably less than 45 min. Likewise, the copolymer is soluble under stirring in alkaline solution of a slightly milder pH of 10.5 at 70° C. within less than 90 min. 0.1M NaOH vs. "3D-Wash" solution (commercially available from Traxer GmbH, Munchen DE). Short dissolve times, i.e. times required to remove the support structures from the 3D models, increase the production rates of 3D models and make the overall process more efficient.

The copolymer according to the invention can be compounded with numerous additives, as are commonly known for 3D-printing materials e.g. polymers such plasticizers, fillers or stabilizers. In this case, however, it is preferred that the amount of additives does not reach 20% or more by weight of the copolymer according to the invention.

The copolymer as described above is particularly suitable for use as a support material in a digital manufacturing process. Another aspect of the invention therefore relates to a support material for a digital manufacturing system wherein the support material comprises a copolymer according to any of the preceding claims, preferably the support material comprises at least 80% by weight of the copolymer as described above. The support material is characterized by its extraordinary support strength properties while at the same time being well dissolvable in alkaline solution.

In an embodiment of the invention, the support material as described above is provided as a filament strand, in particular a continuous filament strand. A filament strand is an advantageous form to feed the said support material to the digital manufacturing system, in particular to the extrusion tip or nozzle of an extrusion head. From the extrusion tip, the support material is deposited unto either a building platform or previously deposited layers. Examples of suitable average diameters for the filament strands of the support material range from 1.2 to 2.5 mm, preferably 1.6 to 1.9 mm.

The invention further relates to a method for preparing a copolymer, preferably a copolymer as described above. The method comprises the steps of:
a) mixing
   methacrylic acid (MAA);
   a phenylalkene, preferably styrene;
   an ethylhexyl acrylate, preferably 2-ethylhexyl acrylate;
   an alkyl methacrylate, preferably methyl methacrylate (MMA);
b) adding the mixture to a solvent comprising a radical initiator;
c) radically copolymerizing the monomers in solution;
d) working up the dissolved copolymer by means of an extruder, in particular a planetary roller extruder.

It is preferred that the monomeric starting material mixture in step b) is constantly and evenly added to the reaction solution over an extended period of time of up to 60 min, preferably up to 90 min. Copolymerization is typically performed at elevated temperatures (60° C. or higher) for several hours. Preferably, a thermally stable and well soluble initiator is used, e.g. an azo initiator. Such a method ensures the random copolymerization of the components. A preferred solvent for the radical copolymerization could be ethanol.

The solvent may be removed while the copolymer is still within the extruder, in particular within a planetary roller extruder. A planetary roller extruder provides for particularly precise and gentle heating and circulation. The working up in step d) is typically performed at high temperatures of 200 to 280° C. In an early segment of the extruder, a viscous solution of the copolymer in solvent may be pumped such that the solvent is evaporated. The concentrated copolymer may be further conveyed through the extruder into later segments, in vacuum, and at slightly higher temperatures of 220 to 280° C. During such a process, residues of solvent, residual monomer and initiator degradation products can be removed so that a melt of pure copolymer is extruded. The extruded product can be cooled and granulated. Throughout such an extrusion process, anhydride intramolecular structures and—to a lesser extent—intermolecular anhydride structures may be formed.

The invention also encompasses a method for building a 3D-model with a digital manufacturing system, the method comprising:
at least partially melting a support material as described above and/or as obtained by a method described above;
depositing the at least partially melted support material, directly or indirectly, onto a platform in the build chamber of the digital manufacturing system using a layer-based additive technique to form a support structure;
depositing a modelling material, directly or indirectly, onto a platform in the build chamber of the digital manufacturing system using the layer-based additive technique to form a three-dimensional model, wherein the three-dimensional model comprises at least one overhanging region supported by the support structure; and
substantially removing the support structure from the three-dimensional model with an aqueous solution.

The substantial removal of the support structure from the three-dimensional model with an aqueous solution is preferably performed in an aqueous alkaline solution of pH 11-13 in a water bath. Removal can occur under constant stirring at elevated temperatures and/or by means of sonication. For example stirring could be performed at 500 rpm and at 70° C.

The invention also relates to the use of a support material as described above in a digital manufacturing process.

The invention is more particularly described in the following examples which are to be understood as illustrations only. The skilled person will appreciate that numerous modifications and variations are likewise possible and are also part of the disclosure.

BRIEF DESCRIPTION OF THE DRAWINGS

The Figures show
FIG. 1 the differential scanning calorimetry (DSC) curve of the polymer according to Example 1, including one repetition of the heating/cooling cycle (heat flow over temperature)

EXAMPLES

Example 1

The following starting materials were mixed in the indicated relative amounts in a stirred tank reactor:

| | |
|---|---|
| MAA | 40.00 wt-% |
| Styrene | 29.75 wt-% |
| 2-ethylhexyl acrylate | 17.50 wt-% |
| MMA | 12.75 wt-% |

Radical polymerization was started by dissolving 1.706 kg of Fujifilm V-59 free radical initiator in 315 kg of ethanol in a different stirred tank reactor under nitrogen atmosphere at 75° C. 450 kg of the monomeric starting material mixture were constantly and evenly added to the reaction solution over the course of 90 minutes. Polymerization was performed at a temperature of 78° C. for 14 hours. The resulting dissolved polymer was worked-up in a planetary roller extruder at temperatures of 200-260° C. at extrusion rates between 5 and 30 kg/h, in order to remove the solvent, monomeric residues and residues of the radical starter. The resulting polymer melt was cooled and pelletized.

Example 1 gives a copolymer according to the present invention (Expl.1).

Example 2

The following starting materials were mixed in the indicated relative amounts in a stirred tank reactor:

| | |
|---|---|
| MAA | 40.00 wt % |
| Styrene | 35.00 wt % |
| n-Butyl acrylate | 25.00 wt % |

The reaction conditions were the same as indicated for example 1.

Example 2 affords a copolymer as known in the state of the art, for comparison purposes (Expl.2).

Example 3

Figure 1:
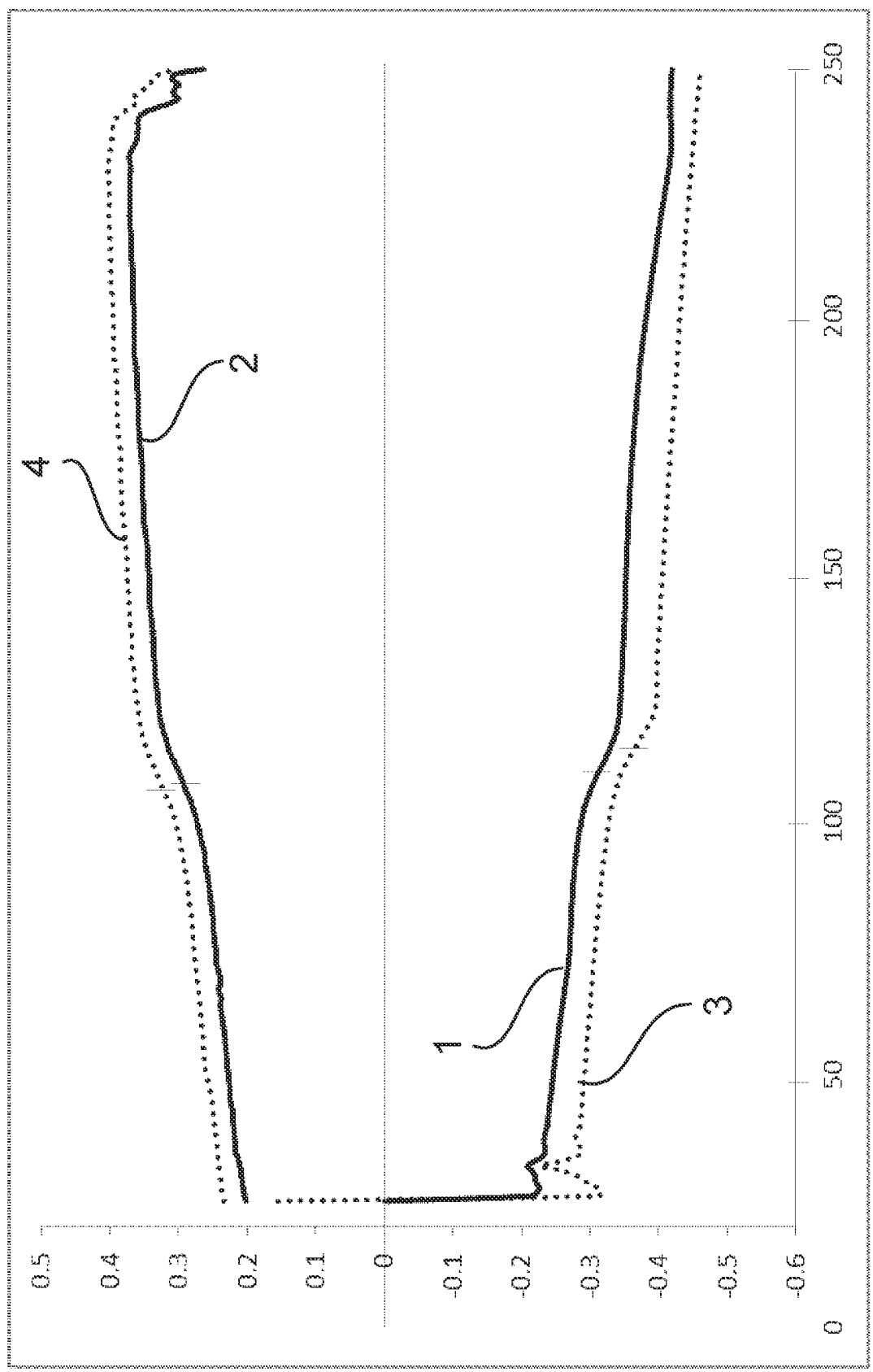
Figure 2:
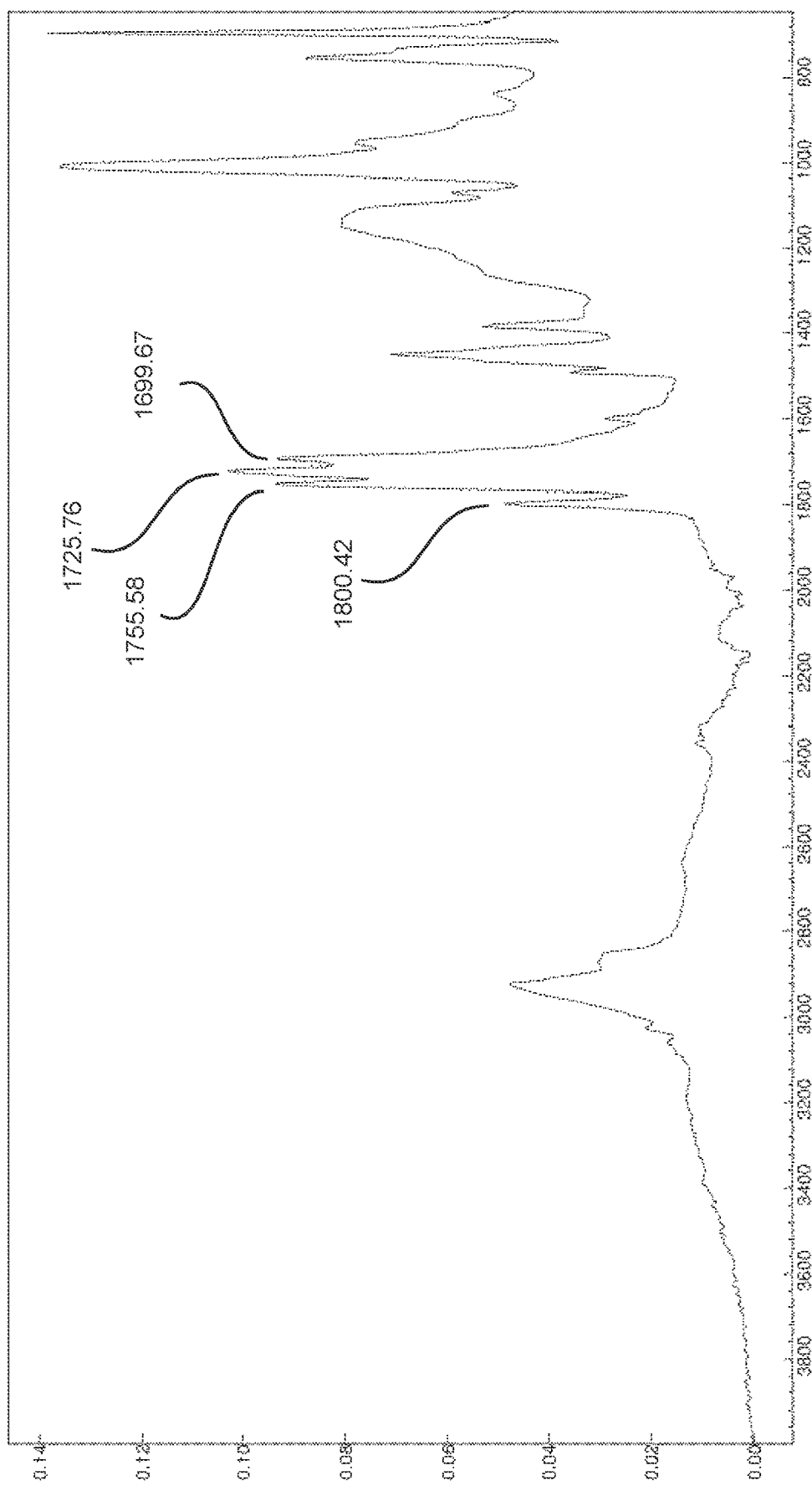
FIG. 2 the Fourier-transform infrared spectrum (FTIR) of the polymer according to Example 1.

The Tg of Expl. 1 was determined according to ISO 11357-2:2013-05. The corresponding differential scanning calorimetry (DSC) curve of the polymer according to Example 1 is depicted in FIG. 1. The x-axis represents the temperature [° C.] and the y-axis the endotherm/exotherm [mW/mg]. Curve 1 shows a first heating sequence of a sample (25.1 mg) from 25° to 250° C. (10 K/min), followed by cooling which is shown in curve 2 (solid lines). The repetition cycle of heating 3 and cooling 4 is displayed in the same diagram (dashed lines). Temperature range and heating rate were the same. Measuring was performed on a Netzsch DSC 214 Polyma device in $N_2$ atmosphere (40.0 ml/min).

One endothermic (heating) or exothermic (cooling) change was registered per curve. The following onset/mid/ and end temperatures were determined:

| Curve | Onset | Mid | End |
|---|---|---|---|
| 1 | 101.5 | 110.2 | 118.6 |
| 2 | 98.2 | 109.3 | 118.5 |
| 3 | 106.7 | 114.1 | 121.0° |
| 4 | 96.6 | 108.1 | 108.1 |
| Mean | | 110.4 | |

The midpoint of each endo-/exothermic change is indicated as a vertical mark in FIG. 1. The exothermic change was observed between 108° C. and 115° C. giving a mean Tg value of 110.4° C. The Tg of Expl. 2 was determined under the same conditions and was found to be slightly lower with a mean 109.9° C.

Example 4

The number average molecular weight (Mn) and the weight average molecular weight (Mw) of Expl. 1 and Expl. 2 were determined via gel permeation chromatography GPC in THF against polystyrene standards according to DIN 55672-1:2016-03.

| Expl. 1 | |
|---|---|
| number average molecular weight (Mn) | 60.80 kg/mol |
| weight average molecular weight (Mw) | 109.90 kg/mol % |
| Expl. 2 | |
| number average molecular weight (Mn) | 60.60 kg/mol |
| weight average molecular weight (Mw) | 119.80 kg/mol |

Example 5

The IR spectrum of Example 1 was measured in order to assess the presence of carboxyl groups along a carbon chain of the copolymer linked at least partly with a side group of a neighbouring monomer unit by forming intramolecular anhydride structures. In addition to the absorbance at 1699.67 $cm^1$, which is characteristic for the acyl moiety of the carboxyl groups, the spectrum shows absorbance peaks at 1726 $cm^1$, 1756 $cm^{-1}$ and 1800 $cm^{-1}$. These are indicators for intramolecular anhydride structures within the copolymer.

Example 6

Dissolvability of the compounds according to Expl. 1 and Expl. 2 in alkaline solution was assessed in the following experimental set-ups:
- 2 g of the copolymer were pressed into the shape of a disk having a diameter of 40 mm and a thickness of 1.5 mm.
- the sample disks were placed in 350 mL aqu. NaOH solution (pH 13, 0.1 mM) at 70° C. under constant stirring (500 rpm)
- in an alternative set-up, the sample disks were placed in 350 mL "3D Wash" solution (pH 10.5, commercially available from Traxer GmbH, preparation according to the supplier's instructions) at 70° C. under constant stirring (500 rpm).

The time required to substantially dissolve and disperse the support structure was measured. When subject to treatments at pH 13, the sample disks of Expl. 1 were completely dissolved within 44 min. The resulting solution was clear, colourless and fibre-free. When subject to the dissolvability test in "3D Wash" at pH 10.5, the disks of Expl. 1 were completely dissolved after 90 min. The resulting solution was clear, colourless and almost fibre-free. Accordingly, the support materials of the present disclosure are capable of being removed from 3D models with short residence time in the alkaline aqueous solutions.

In contrast, when subject to treatments at pH 13, the sample disks of Expl. 2 were not dissolved before 53 min. The copolymer according to the invention, therefore, has preferable properties for use as support material.

The invention claimed is:

1. A copolymer comprising
   a plurality of carboxyl monomer units derived from methacrylic acid monomers (MM);
   a plurality of phenyl monomer units;
   a plurality of first carboxylate ester monomer units derived from alkyl (meth-)acrylate monomers; and
   a plurality of second carboxylate ester monomer units derived from ethylhexyl acrylate monomers;
   wherein the first and the second carboxylate ester monomer units differ in their structural formula, wherein relative amounts of the monomer units are as follows:
   35-45 wt % of the carboxyl monomer units derived from methacrylic acid monomers (MAA);
   25-30 wt % of the phenyl monomer units;
   10-15 wt % of the first carboxylate ester monomer units derived from alkyl methacrylate monomers,
   12-20 wt % of the second carboxylate ester monomer units derived from ethylhexyl acrylate monomers; based on a weight of the copolymer.

2. The copolymer according to claim 1, wherein the first carboxylate ester monomer units are derived from methyl methacrylate monomers (MMA).

3. The copolymer according to claim 1 wherein the relative amounts add up to 100 wt % to give a tetrapolymer.

4. The copolymer according to claim 1 having a glass transition temperature Tg in the range of 90° C. to 140° C., measured according to ISO 11357-2:2013-05.

5. The copolymer according to claim 1, wherein a number average molecular weight (Mn) of the copolymer is in the range of 50,000-70,000 g/mol, determined by gel permeation chromatography according to DIN 55672-1:2016-03.

6. The copolymer according to claim 1, wherein a weight average molecular weight (Mw) of the copolymer is in the range of 90,000 to 140,000 g/mol, determined by gel permeation chromatography according to DIN 55672-1:2016-03.

7. The copolymer according to claim 1 wherein carboxyl groups are present along a carbon chain of the copolymer and are linked at least partly in each case with a side group of a neighboring monomer unit within the carbon chain with formation of intramolecular anhydride structures.

8. The copolymer according to claim 1, wherein the copolymer is soluble under stirring in alkaline solution of pH 13 (0.1M NaOH) at 167° F. (75° C.) within less than 50 min.

9. A support material for a digital manufacturing system wherein the support material comprises a copolymer according to claim 1.

10. The support material according to claim 9 provided as a filament strand.

11. The copolymer according to claim 1, wherein the phenyl monomer units are derived from styrene monomers.

12. The copolymer according to claim 1, wherein the copolymer has a glass transition temperature Tg in the range of 94° C. to 120° C., measured according to ISO 11357-2:2013-5.

13. The support material according to claim 9, wherein the support material comprises at least 80% by weight of the copolymer.

* * * * *